US012172426B2

(12) United States Patent
Hayasaka

(10) Patent No.: US 12,172,426 B2
(45) Date of Patent: Dec. 24, 2024

(54) RECORDING DEVICE AND RECORDING METHOD

(71) Applicant: SEIKO EPSON CORPORATION, Tokyo (JP)

(72) Inventor: Nobuyuki Hayasaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 17/815,304

(22) Filed: Jul. 27, 2022

(65) Prior Publication Data

US 2023/0037226 A1 Feb. 2, 2023

(30) Foreign Application Priority Data

Jul. 30, 2021 (JP) ................................ 2021-125496

(51) Int. Cl.

*B41J 11/00* (2006.01)
*B41J 2/21* (2006.01)
*B41M 5/00* (2006.01)
*B41M 7/00* (2006.01)

(52) U.S. Cl.

CPC ........ *B41J 11/00214* (2021.01); *B41J 2/2117* (2013.01); *B41M 5/0011* (2013.01); *B41M 7/0072* (2013.01); *B41M 2205/38* (2013.01)

(58) Field of Classification Search

CPC ................ B41J 11/00214; B41J 2/2117; B41J 2025/008; B41J 11/0015; B41M 5/0011; B41M 7/0072; B41M 2205/38

USPC .......................................... 347/101; 341/101

See application file for complete search history.

(56) References Cited

U.S. PATENT DOCUMENTS 10,093,116 B2 10/2018 Toyama et al.
2003/0016259 A1* 1/2003 Otokita .................. B41J 11/009 347/14
2010/0053259 A1* 3/2010 Groenenboom ....... B41J 13/223 347/32
2012/0081461 A1* 4/2012 Kakutani ............... B41J 2/2117 347/43
2017/0305175 A1* 10/2017 Toyama ................... B41J 15/16
2019/0061382 A1* 2/2019 Okuda ................... B41J 2/2107

FOREIGN PATENT DOCUMENTS

JP 2017-196745 A 11/2017

* cited by examiner

*Primary Examiner* — Jason S Uhlenhake
*Assistant Examiner* — Alexander D Shenderov
(74) *Attorney, Agent, or Firm* — WORKMAN NYDEGGER

(57) ABSTRACT

A recording device includes transport units, a corona irradiation unit, an ejecting unit, and a control unit, and changes intensity of irradiation, performed the corona irradiation unit, according to ejection density of the white ink, when a target recording medium is formed with a colored image with a colored ink on the background image after the target recording medium is formed with a background image with a white ink.

10 Claims, 4 Drawing Sheets

RECORDING DEVICE AND RECORDING METHOD

The present application is based on, and claims priority from JP Application Serial Number 2021-125496, filed Jul. 30, 2021, the disclosure of which is hereby incorporated by reference herein in its entirety.

BACKGROUND

1. Technical Field

The present disclosure relates to a recording device and a recording method.

2. Related Art

In the past, various recording devices have been used to perform recording by ejecting ink from an ejecting unit onto a target recording medium. For example, JP 2017-196745 A discloses a printing apparatus that includes a corona processor that modifies a surface of a recording medium by irradiating the surface of the recording medium with a corona discharge, and that ejects ink from an ejecting head onto a roll-shaped recording medium to form an image. JP 2017-196745 A describes that an ink mist adheres to the ejecting head due to charging of the recording medium.

As a result of diligent research by the present inventors, in an existing recording device including a corona irradiation unit that modifies a surface of a target recording medium by irradiating the surface of the target recording medium with a corona discharge, as in the printing apparatus of JP 2017-196745 A, it was found that a radical is present on the surface of the target recording medium in association with the irradiation with a corona discharge, and a radical is present also in the ejecting unit due to influence of the radical on the surface of the target recording medium. Then, it was found that when a radical is present in the ejecting unit, the radical may react with an ink mist to form an adhesive, and the adhesive may adhere to an ink ejecting port to cause an ejection failure. Note that, the printing apparatus of JP 2017-196745 A is provided with an ionizer, and is capable of destaticizing a surface of a recording medium by the ionizer, but it is also assumed that the surface of the recording medium cannot be completely destaticized, and in such a case, an ejection failure may occur.

SUMMARY

A recording device of the present disclosure for solving the above described problems includes a transport unit configured to transport a target recording medium, a corona irradiation unit disposed in a transport path of the target recording medium, and configured to modify a surface of the target recording medium by irradiating the surface with a corona discharge, an ejecting unit disposed downstream of the corona irradiation unit in the transport path, and configured to eject ink onto the target recording medium, and a control unit configured to control driving of the transport unit, the corona irradiation unit, and the ejecting unit, wherein the ejecting unit includes a first head that ejects a white ink, as the ink, for forming a background image, and a second head that is disposed downstream of the first head in the transport path, and ejects a colored ink for forming a colored image, and the control unit, when the target recording medium is formed with the colored image with the colored ink on the background image after the target recording medium is formed with the background image with the white ink, changes intensity of irradiation, performed by the corona irradiation unit, according to ejection density of the white ink.

Further, another recording device of the present disclosure for solving the above described problems includes a transport unit configured to transport a target recording medium, a corona irradiation unit disposed in a transport path of the target recording medium, and configured to irradiate a surface of the target recording medium with a corona discharge to modify the surface, an ejecting unit disposed downstream of the corona irradiation unit in the transport path, and configured to eject ink onto the target recording medium, and a control unit configured to control driving of the transport unit, the corona irradiation unit, and the ejecting unit, wherein the ejecting unit includes a first head that ejects a white ink, as the ink, for forming a background image, and a second head that is disposed downstream of the first head in the transport path, and ejects a colored ink for forming a colored image, and the control unit, when the target recording medium is a registered target recording medium that is registered in advance, and data for forming the background image by the white ink is not included in recorded data, automatically adds the data for forming the background image by the white ink to the recorded data.

Additionally, a recording method of the present disclosure for solving the above described problems is a recording method that can be performed using a recording device that includes a transport unit for transporting a target recording medium, a corona irradiation unit disposed in a transport path of the target recording medium, and irradiating a surface of the target recording medium with a corona discharge to modify the surface, and an ejecting unit disposed downstream of the corona irradiation unit in the transport path, and ejecting ink onto the target recording medium, the ejecting unit including a first head that ejects a white ink, as the ink, for forming a background image, and a second head that is disposed downstream of the first head in the transport path, and ejects a colored ink for forming a colored image, wherein the recording method includes changing intensity of the irradiation, performed by the corona irradiation unit, according to ejection density of the white ink, when the target recording medium is formed with the colored image with the colored ink on the background image after the target recording medium is formed with the background image with the white ink.

DESCRIPTION OF EXEMPLARY EMBODIMENTS

Figure 1:
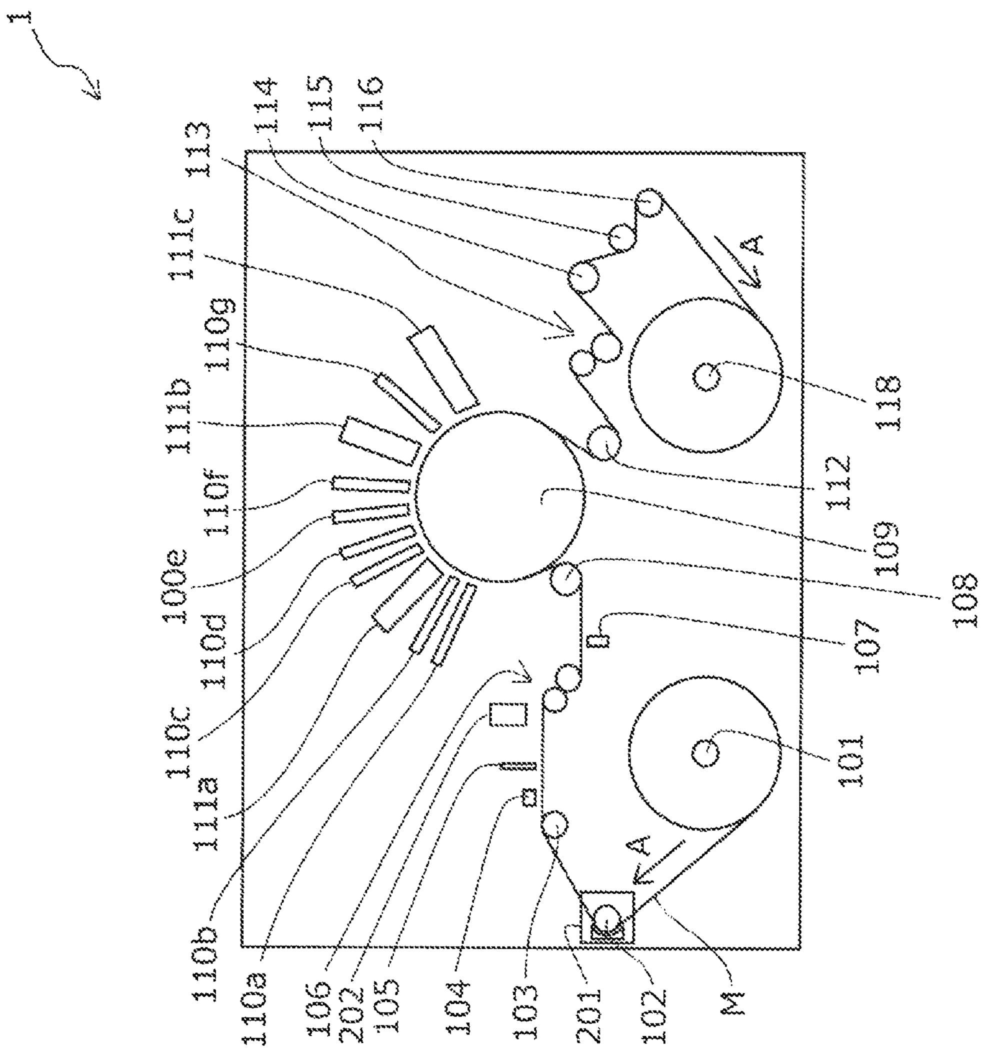
FIG. 1 is a schematic diagram of a recording device according to a working example of the present disclosure.

First, the present disclosure will be schematically described.

A recording device of a first aspect of the present disclosure for solving the above described problems includes a transport unit configured to transport a target recording medium, a corona irradiation unit disposed in a transport path of the target recording medium, and configured to modify a surface of the target recording medium by irradiating the surface with corona discharge, an ejecting unit disposed downstream of the corona irradiation unit in the transport path, and configured to eject ink onto the target recording medium, and a control unit configured to control driving of the transport unit, the corona irradiation unit, and the ejecting unit, wherein the ejecting unit includes a first head and a second head, the first head ejecting, as the ink, a white ink for forming a background image, the second head being disposed downstream of the first head in the transport path and ejecting a colored ink for forming a colored image, and when the target recording medium is formed with the colored image with the colored ink on the background image after the target recording medium is formed with the background image with the white ink, the control unit changes intensity of the irradiation, performed by the corona irradiation unit, according to ejection density of the white ink.

According to the present aspect, when the target recording medium is formed with the colored image with the colored ink on the background image after the target recording medium is formed with the background image with the white ink, the intensity of irradiation performed by the corona irradiation unit is changed according to the ejection density of the white ink. As a result of diligent research by the inventors, it was found that when the target recording medium was formed with the colored image with the colored ink on the background image after the target recording medium was formed with the background image with the white ink, an amount of radicals present on a surface of the target recording medium was reduced in association with irradiation with a corona discharge, and an ejection failure was unlikely to occur. Thus, when the target recording medium is formed with the colored image with the colored ink on the background image after the target recording medium is formed with the background image with the white ink, it is possible to effectively suppress occurrence of an ink ejection failure, by changing the intensity of irradiation, performed by the corona irradiation unit, according to the ejection density of the white ink.

A recording device of a second aspect of the present disclosure is the recording device of the first aspect, wherein the control unit, only when the target recording medium is the registered target recording medium that is registered in advance, and when the target recording medium is formed with the colored image with the colored ink on the background after the target recording medium is formed with the background image with the white ink, changes intensity of the irradiation, performed by the corona irradiation unit, according to ejection density of the white ink.

As a result of diligent research by the present inventors, it was found that, depending on a type of a target recording medium, an amount of radicals present on a surface of the target recording medium changes in association with irradiation with a corona discharge. According to the present aspect, only in a case of the registered target recording medium, and when the target recording medium is formed with the colored image with the colored ink on the background image after the target recording medium is formed with the background image with the white ink, since the intensity of irradiation performed by the corona irradiation unit is changed according to the ejection density of the white ink, it is possible to prevent recording control from becoming complicated, when a target recording medium is used that does not correspond to the registered target recording medium, and is unlikely to cause an ink ejection failure.

A recording device of a third aspect of the present disclosure is the recording device of the second aspect, wherein the registered target recording medium includes resin as a material.

According to the present aspect, the registered target recording medium includes resin as a material. In the target recording medium including resin as a material, an amount of radicals present on a surface increases in association with irradiation with a corona discharge, and thus an ink ejection failure easily occurs, but it is possible to effectively suppress occurrence of an ink ejection failure, even when the target recording medium including resin as a material is used.

A recording device of a fourth aspect of the present disclosure is the recording device of any one of the first to third aspects, wherein the control unit, when the target recording medium is formed with the colored image with the colored ink on the background image without being formed with the background image with the white ink, changes the intensity of irradiation performed by the corona irradiation unit so as to be equal to or less than 20% of maximum intensity of the irradiation performed by the corona irradiation unit when the target recording medium is formed with the colored image with the colored ink on the background image after the target recording medium is formed with the background image with the white ink.

According to the present aspect, when the target recording medium is formed with the colored image with the colored ink without being formed with the background image with the white ink, the intensity of irradiation performed by the corona irradiation unit is changed to be equal to or less than 20% of the maximum intensity of irradiation by the corona irradiation unit when the target recording medium is formed with the colored image with the colored ink on the background image after the target recording medium is formed with the background image with the white ink. In this way, when an ink ejection failure easily occurs, that is, when the target recording medium is formed with the colored image with the colored ink without being formed with the background image with the white ink, by reducing the intensity of irradiation performed by the corona irradiation unit, it is possible to effectively suppress occurrence of an ink ejection failure.

A recording device of a fifth aspect of the present disclosure is the recording device of any one of the first to third aspects that includes a gap adjustment unit configured to adjust a gap between the ejecting unit and the target recording medium, wherein the control unit controls the gap adjustment unit to increase the gap when the target recording medium is formed with the colored image with the colored ink without being formed with the background image with the white ink, to be wider than the gap when the target recording medium is formed with the colored image with the colored ink on the background image after the target recording medium is formed with the background image with the white ink.

According to the present aspect, the gap adjustment unit is controlled to increase the gap when the target recording medium is formed with the colored image with the colored ink without being formed with the background image with the white ink, to be wider than the gap when the target recording medium is formed with the colored image with the colored ink on the background image after the target recording medium is formed with the background image with the white ink. By increasing the gap, a radical is less likely to adhere to the ejecting unit. Therefore, in this manner, occurrence of an ink ejection failure can be effectively suppressed, even when a large number of radicals are likely to be generated on a surface of the target recording medium, that is, when the target recording medium is formed with the colored image with the colored ink without being formed with the background image with the white ink.

A recording device of a sixth aspect of the present disclosure is the recording device of any one of the first to third aspects that includes a maintenance unit configured to maintain the ejecting unit, wherein the control unit controls the maintenance unit to decrease an interval of maintenance performed by the maintenance unit when the target recording medium is formed with the colored image with the colored ink without being formed with the background image with the white ink, to be shorter than an interval of maintenance performed by the maintenance unit when the target recording medium is formed with the colored image with the colored ink on the background image after the target recording medium is formed with the background image with the white ink.

According to the present aspect, the an interval of maintenance performed by the maintenance unit when the target recording medium is formed with the colored image with the colored ink without being formed with the background image with the white ink is decreased to be shorter than the an interval of maintenance performed by the maintenance unit when the target recording medium is formed with the colored image with the colored ink on the background image after the target recording medium is formed with the background image with the white ink. By shortening the maintenance interval, a radical is less likely to remain in the ejecting unit. Therefore, in this manner, occurrence of an ink ejection failure can be effectively suppressed, even when a large number of radicals are likely to be generated on a surface of the target recording medium, that is, when the target recording medium is formed with the colored image with the colored ink without being formed with the background image with the white ink.

A recording device of a seventh aspect of the present disclosure includes a transport unit configured to transport a target recording medium, a corona irradiation unit disposed in a transport path of the target recording medium, and configured to irradiate a surface of the target recording medium with a corona discharge to modify the surface, an ejecting unit disposed downstream of the corona irradiation unit in the transport path, and configured to eject ink onto the target recording medium, and a control unit configured to control driving of the transport unit, the corona irradiation unit, and the ejecting unit, wherein the ejecting unit includes a first head that ejects a white ink, as the ink, for forming a background image, and a second head that is disposed downstream of the first head in the transport path, and ejects a colored ink for forming a colored image, and the control unit, when the target recording medium is the registered target recording medium that is registered in advance, and the data for forming the background image by the white ink is not included in recorded data, automatically adds the data for forming the background image by the white ink to the recorded data.

According to the present aspect, when the target recording medium is the registered target recording medium that is registered in advance, and the data for forming the background image by the white ink is not included in the recorded data, the data for forming the background image by the white ink is automatically added to the recorded data. Therefore, by registering a target recording medium on which a large amount of radicals are present on a surface in association with irradiation with a corona discharge as a registered target recording medium, it is possible to prevent a large number of radicals from being present on the surface of the target recording medium when the background image is not formed by the white ink, thereby effectively suppressing occurrence of an ink ejection failure.

A recording device of an eighth aspect of the present disclosure is the recording device of the seventh aspect that includes a first recording mode and a second recording mode as recording modes, wherein the control unit, in the first recording mode, when the target recording medium is the registered target recording medium that is registered in advance, and the data for forming the background image by the white ink is not included in the recorded data, automatically adds the data for forming the background image by the white ink to the recorded data, and in the second recording mode, even when the target recording medium is the registered target recording medium that is registered in advance, and the data for forming the background image by the white ink is not included in the recorded data, does not add the data for forming the background image by the white ink to the recorded data.

According to the present aspect, in addition to the first recording mode, the second recording mode is included in which, even when the target recording medium is the registered target recording medium that is registered in advance, and the data for forming the background image by the white ink is not included in the recorded data, the data for forming the background image by the white ink is not added to the recorded data. Thus, when a user does not want to form the background image, the background image is not formed and the colored image can be formed.

A recording device of a ninth aspect of the present disclosure is the recording device of the seventh or eighth aspect, wherein the control unit, when the target recording medium is the registered target recording medium that is registered in advance, and the data for forming the background image by the white ink is included in the recorded data, does not add the data for forming the background image by the white ink to the recorded data.

According to the present aspect, when the target recording medium is the registered target recording medium that is registered in advance, and the data for forming the background image by the white ink is included in the recorded data, the data for forming the background image by the white ink is not added to the recorded data. Thus, when the data for forming the background image by the white ink is included in the recorded data, it is possible to prevent the data for forming the background image by the white ink from being further added, such that recording processing is not complicated.

A recording device of a tenth aspect of the present disclosure is the recording device of any one of the seventh to ninth aspects, wherein the control unit, when the target recording medium is the registered target recording medium that is registered in advance, the data for forming the background image by the white ink is not included in the recorded data, and automatically adding the data for forming the background image by the white ink to the recorded data, changes intensity of the irradiation, performed by the corona irradiation unit, according to ejection density of the white ink.

According to the present aspect, when the target recording medium is the registered target recording medium that is registered in advance, the data for forming the background image by the white ink is not included in the recorded data, and the data for forming the background image by the white ink is automatically added to the recorded data, the intensity of irradiation performed by the corona irradiation unit is changed according to the ejection density of the white ink. Although there is a tendency that as the ejection density of the white ink increases, an amount of radicals present on the target recording medium decreases, by changing the intensity of irradiation, performed by the corona irradiation unit, in accordance with such a tendency, it is possible to effectively suppress occurrence of an ink ejection failure.

A recording method of an eleventh aspect of the present disclosure is a recording method that can be performed using a recording device that includes a transport unit for transporting a target recording medium, a corona irradiation unit disposed in a transport path of the target recording medium, and irradiating a surface of the target recording medium with a corona discharge to modify the surface, and an ejecting unit disposed downstream of the corona irradiation unit in the transport path, and ejecting ink onto the target recording medium, the ejecting unit including a first head that ejects a white ink, as the ink, for forming a background image, and a second head that is disposed downstream of the first head in the transport path, and ejects a colored ink for forming a colored image, wherein the recording method includes changing the intensity of irradiation, performed by the corona irradiation unit, according to ejection density of the white ink, when the target recording medium is formed with the colored image with the colored ink on the background image after the target recording medium is formed with the background image with the white ink.

According to the present aspect, when the target recording medium is formed with the colored image on the background image with the colored ink after the target recording medium is formed with the background image with the white ink, the intensity of irradiation performed by the corona irradiation unit is changed according to the ejection density of the white ink. Therefore, it is possible to effectively suppress occurrence of an ink ejection failure.

Figure 2:
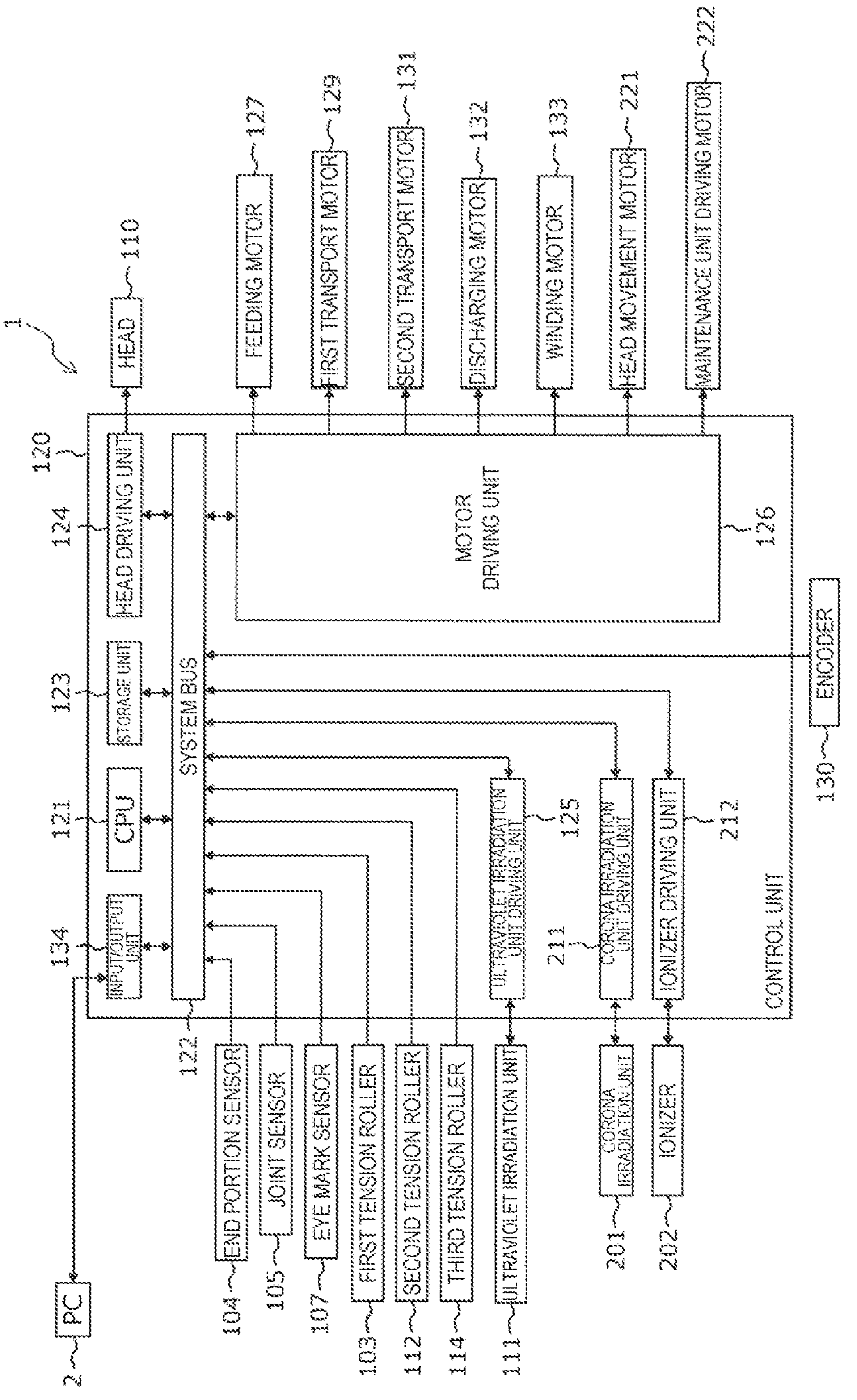
FIG. 2 is a block diagram illustrating an electrical configuration of the recording device in FIG. 1.

Embodiments of the present disclosure will be described below with reference to the accompanying drawings. First, an overview of a recording device 1 according to a working example of the present disclosure will be described with reference to FIG. 1 and FIG. 2. The recording device 1 according to the present working example is a recording device that forms an image on a target recording medium M made of paper, cloth, film, or the like, and is communicatably coupled to a PC 2 as illustrated in FIG. 2. Note that, as illustrated in FIG. 1, the recording device 1 of the present working example is configured to be capable of performing recording on the target recording medium M wound in a roll shape. However, the present disclosure is not limited to the configuration in which such a target recording medium can be used, and for example, a configuration may be adopted in which a target recording medium having a shape obtained by alternately folding an elongated target recording medium can be used, or the like.

As illustrated in FIG. 1, the recording device 1 of the present working example includes a feeding unit 101 capable of rotating to feed the target recording medium M while the roll-shaped target recording medium M is set. By the feeding unit 101, the target recording medium M is fed to a first driving roller 106 via a driven roller 102 and a first tension roller 103. Then, the target recording medium M is transported in a transport direction A by the first driving roller 106. Here, being driven means being moved in association with movement of the target recording medium M in contact.

In a vicinity of the driven roller 102, a corona irradiation unit 201 is provided that irradiates the target recording medium M being transported with a corona discharge. By irradiating a surface of the target recording medium M with a corona discharge, the surface of the target recording medium M is modified, and recording quality is improved.

Tension of the target recording medium M being fed from the feeding unit 101 is detected by the first tension roller 103, and torque of a feeding motor 127 illustrated in FIG. 2 is controlled by a control unit 120. An end portion sensor 104 that detects an end portion of the target recording medium M, and a joint sensor 105 that detects a joint of the target recording medium M are provided between the first tension roller 103 and the first driving roller 106. When the target recording medium M is transported while meandering, based on a detection result of the end portion sensor 104, the control unit 120 performs control to correct the meandering transportation by causing the feeding unit 101 and the first tension roller 103 to interlock.

In addition, an ionizer 202 that irradiates with an ion is provided between the first tension roller 103 and the first driving roller 106. A surface of the target recording medium M may be charged when the target recording medium M is peeled off, or the like, but the surface of the recording medium M can be destaticized by irradiating from the ionizer 202 with an ion having a charge opposite to that of the charged ion on the surface of the target recording medium M.

A driven roller 108 is provided downstream the first driving roller 106 in the transport direction A, and further, a driven drum 109 serving as a support portion of the target recording medium M is provided downstream in the transport direction A. Between the first driving roller 106 and the driven roller 108, an eye mark sensor 107 is provided that detects an eye mark recorded on the target recording medium M. Here, the eye mark is a mark used in controlling recording timing when recording is temporarily stopped and subsequently restarted, when recording is further performed following previous recording, or the like. Note that, the eye mark may be recorded on the target recording medium M along with an image by a head 110 as an ejecting unit, or may be recorded on the target recording medium M in advance.

A plurality of the heads 110 as an ejecting unit for ejecting ink, and a plurality of ultraviolet irradiation units 111 are provided at positions facing the driven drum 109. Since an ultraviolet curable ink that is cured by being irradiated with ultraviolet rays is used for all the inks, the recording device 1 of the present working example is provided with the ultraviolet irradiation unit 111 for curing the ink. However, in the present disclosure, inks other than an ultraviolet curable ink can be used as ink, and in this case, the ultraviolet irradiation unit 111 need not be provided. Further, the recording device 1 of the present working example includes, as the heads 110, seven among the heads 110 including a head 110*a* and a head 110*b* for ejecting a white ink for forming a background image, a head 110*c*, a head 110*d*, a head 110*e*, and a head 110*f* for ejecting colored inks for forming a colored image, and a head 110*g* for ejecting a post-processing ink, and includes, as the ultraviolet irradiation units 111, three among the ultraviolet irradiation units 111 including an ultraviolet irradiation unit 111*a*, an ultraviolet irradiation unit 111*b*, and an ultraviolet irradiation unit 111*c*. However, there is no particular limitation on the number or an arrangement of the heads 110 and the ultraviolet irradiation units 111.

At positions facing the heads 110 and the ultraviolet irradiation units 111, the target recording medium M is transported while being wound around the driven drum 109. The driven drum 109 is provided with an encoder 130 as illustrated in FIG. 2, and a rotational speed of the driven drum 109 corresponding to a transport speed of the target recording medium M is detected by the encoder 130, and the control unit 120 controls ejection timing of ink from the head 110 so that a desired image is formed at a desired position of the target medium M. Note that, a transport distance of the target recording medium M is also managed by the control unit 120 based on a detection result of the encoder 130.

A second driving roller 113 is provided downstream the driven drum 109 in the transport direction A via a second tension roller 112. Tension in the transport direction A applied to the target recording medium M in a state of wound around the driven drum 109 is detected by the second tension roller 112, and is set to desired tension, by the control unit 120 controlling torque of a second transport motor 131 illustrated in FIG. 2, which is a driving motor of the second driving roller 113, based on a detection result in the second tension roller 112.

A third tension roller 114, a driven roller 115, and a driven roller 116 are disposed in order, downstream the second driving roller 113 in the transport direction A. Then, a winding unit 118 is provided downstream the driven roller 116 in the transport direction A. The winding unit 118 is capable of rotating to wind the target recording medium M in a roll shape. Tension applied to the winding unit 118 is detectable by the third tension roller 114, and is set to desired tension by the control unit 120 controlling torque of a winding motor 133 illustrated in FIG. 2, which is a driving motor of the winding unit 118, based on a detection result of the third tension roller 114. Note that, the tension can be changed in accordance with a winding diameter of the target recording medium M wound around the winding unit 118.

Next, an electrical configuration of the recording device 1 of the working example will be described using FIG. 2. The recording device 1 of the present working example is coupled to the PC 2, and has a configuration in which the control unit 120 is provided inside the recording device 1, but the present disclosure is not limited to such a configuration. For example, the PC 2 coupled to the recording device 1 may be configured to play at least a part of a role of the control unit of the recording device 1.

The control unit 120 includes a CPU 121 that manages control of the entire recording device 1. The CPU 121 is coupled through a system bus 122 to a storage unit 123 that includes a ROM that stores various types of control programs and the like to be executed by the CPU 121, and a RAM and an EEPROM that can temporarily store data.

Furthermore, the CPU 121 is coupled through the system bus 122 to a head driving unit 124 for driving each head 110 to eject ink. Additionally, the CPU 121 is coupled through the system bus 122 to the ultraviolet irradiation unit driving unit 125 for driving the ultraviolet irradiation unit 111 to irradiate with ultraviolet light.

In addition, the CPU 121 is coupled through the system bus 122 to a corona irradiation unit driving unit 211 for driving the corona irradiation unit 201 to irradiate with a corona discharge. In addition, the CPU 121 is coupled through the system bus 122 to an ionizer driving unit 212 for driving the ionizer 202 to irradiate with an ion.

Additionally, the CPU 121 is coupled through the system bus 122 to a motor driving unit 126, which is coupled to a feeding motor 127, a first transport motor 129, a second transport motor 131, a discharging motor 132, a winding motor 133, a head movement motor 221, and a maintenance unit driving motor 222. Here, the feeding motor 127 is a driving motor of the feeding unit 101. Further, the first transport motor 129 is a driving motor of the first driving roller 106. Further, the second transport motor 131 is a driving motor of the second driving roller 113. Further, the discharging motor 132 is a driving motor of a discharging roller 117. Further, the winding motor 133 is a driving motor of the winding unit 118. Further, the head movement motor 221 is a driving motor constituting an gap adjustment unit for changing a gap between the head 110 and the driven drum 109, that is, a gap PG (paper gap) between the head 110 and the target recording medium M by moving the head 110. Then, the maintenance unit driving motor 222 is a driving motor of a wiper and a suction cap (not illustrated) capable of maintaining the head 110, and constitutes the maintenance unit together with the wiper and the suction cap. Note that, by performing the maintenance of the head 110, an adhesive adhering to a nozzle of the head 110 is removed, and an amount of radicals present in the head 110 decreases.

Additionally, the CPU 121 is coupled through the system bus 122 to the end portion sensor 104, the joint sensor 105, and the eye mark sensor 107. Further, the CPU 121 is coupled through the system bus 122 to the first tension roller 103, the second tension roller 112, and the third tension roller 114. In addition, the CPU 121 is coupled through the system bus 122 to the encoder 130. Furthermore, the CPU 121 is coupled through the system bus 122 to the PC 2 for receiving and transmitting data such as image data and signals through an input-output unit 134.

Figure 3:
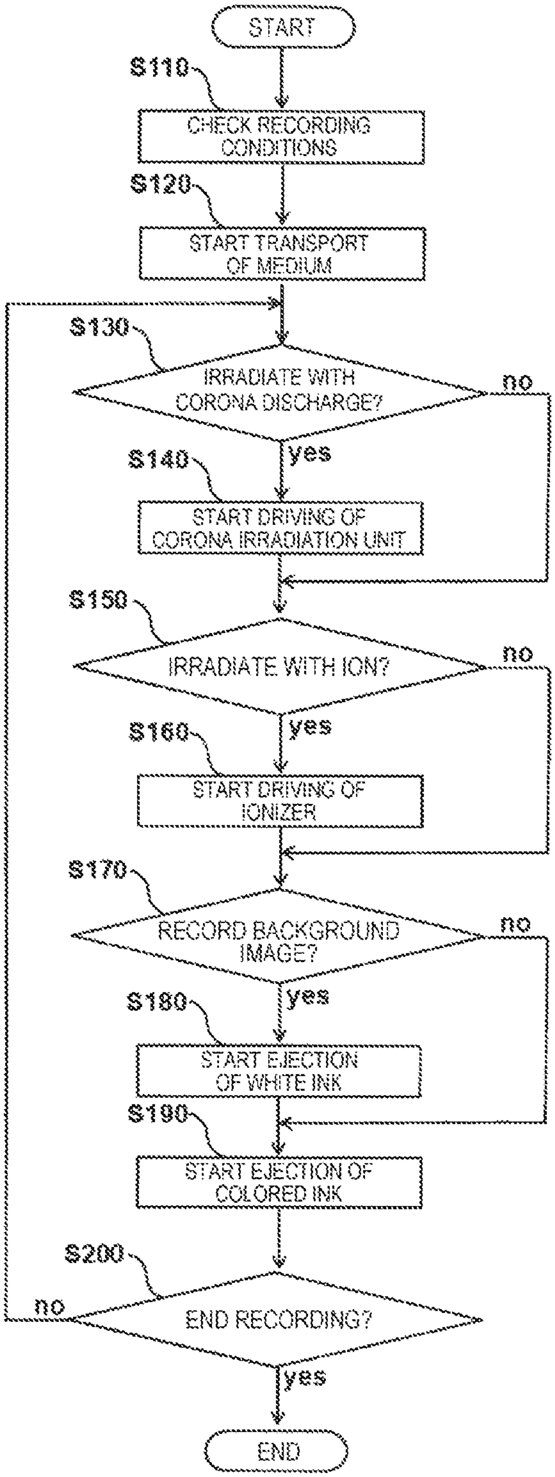
FIG. 3 is a flowchart of a recording method according to a working example performed using the recording device in FIG. 1.

Next, a working example of a recording method executable by the above recording device 1 will be described using FIG. 3. For example, when recorded data is input from the PC 2 or the like, and the recording method of the present working example is started, first, the control unit 120 checks recording conditions from the recorded data in step S110, as illustrated in FIG. 3. The check of the recording conditions is, for example, a check of a type of a target recording medium, whether to record a background image or not, and ejection density of the background image. Note that, the "ejection density" in the present specification is represented by the number of pixels among effective pixels onto which ink is ejected, and for example, when ink for 50 dots is ejected in a configuration in which the ink can be ejected onto up to 100 dots in a predetermined unit area, the ejection density can be regarded as 50%.

When the recording conditions are checked in step S110, transport of the target recording medium M is started in step S120. Then, in step S130, the control unit 120 determines whether to irradiate a desired position of the target recording medium M with a corona discharge from the corona irradiation unit 201, or not. The determination of whether to irradiate with a corona discharge or not is performed based on contents of the recorded data checked in step S110. When it is determined in step S130 to irradiate with a corona discharge, the processing proceeds to step S140, a desired position of the target recording medium M is irradiated with a corona discharge from the corona irradiation unit 201, and then the processing proceeds to step S150. On the other hand, when it is determined not to irradiate with a corona discharge in step S130, the processing proceeds to step S150 without proceeding to step S140.

In step S150, the control unit 120 determines whether to irradiate a desired position of the target recording medium M with an ion from the ionizer 202, or not. The determination of whether to irradiate with an ion or not is performed based on the contents of the recorded data checked in step S110. When it is determined to irradiate with an ion in step S150, the processing proceeds to step S160, and a desired position of the target recording medium M is irradiated with an ion from the ionizer 202, and then the processing proceeds to step S170. On the other hand, when it is determined not to irradiate with an ion in step S130, the processing proceeds to step S170 without proceeding to step S160.

In step S170, the control unit 120 determines whether to record a background image at a desired position of the target recording medium M, or not. The determination of whether to record the background image or not is performed based on the contents of the recorded data checked in step S110. When it is determined to record the background image in step S170, the processing proceeds to step S180, and white inks are ejected from the head 110*a* and the head 110*b* at a desired position of the target recording medium M to form the background image, and then the processing proceeds to step S190. On the other hand, when it is determined not to record the background image in step S170, the processing proceeds to step S190 without proceeding to step S180.

In step S190, a colored image is recorded at a desired position of the target recording medium M. Here, when the background image is recorded in step S180, the colored image is recorded at the position where the background image is formed. The recording of the colored image is performed by ejecting a black ink, a cyan ink, a magenta ink, and a yellow ink as the colored inks from the head 110*c*, the head 110*d*, the heads 110*e* and the head 110*f*, and ejecting a post-processing ink from the head 110*g* as necessary. In addition, in step S180 and step S190, ultraviolet radiation from each ultraviolet irradiation unit 111 is also performed in accordance with ejection of each ink from each head.

After step S190 ends, the processing proceeds to step S200, and the control unit 120 determines whether all of the input recorded data is recorded or not. When it is determined that all of the input recorded data is recorded, the recording method of the present working example ends. On the other hand, when it is determined that all of the input recorded data is not recorded, then the processing returns to step S130, and then step S130 to step S190 are repeated until it is determined that all of the input recorded data is recorded.

Here, once the recording device 1 of the present working example is summarized, the recording device 1 of the present working example includes the first driving roller 106 and the second driving roller 113 as the transport unit for transporting the target recording medium M, the corona irradiation unit 201 disposed in the transport path of the target recording medium M, and irradiating a surface of the target recording medium M with a corona discharge to modify the surface of the target recording medium M, the head 110 as the ejecting unit disposed downstream of the corona irradiation unit 201 in the transport path, and ejecting ink onto the target recording medium M, and the control unit 120 for controlling driving of the first driving roller 106, the second driving roller 113, the corona irradiation unit 201, and the head 110. Then, the head 110 includes the head 110*a* and the head 110*b* as first heads for ejecting white inks, as ink, for forming a background image, the head 110*c*, the head 110*d*, the head 110*e*, and the head 110*f*, as second heads disposed downstream of the first head in the transport path, and ejecting colored inks for forming a colored image.

Figure 4:
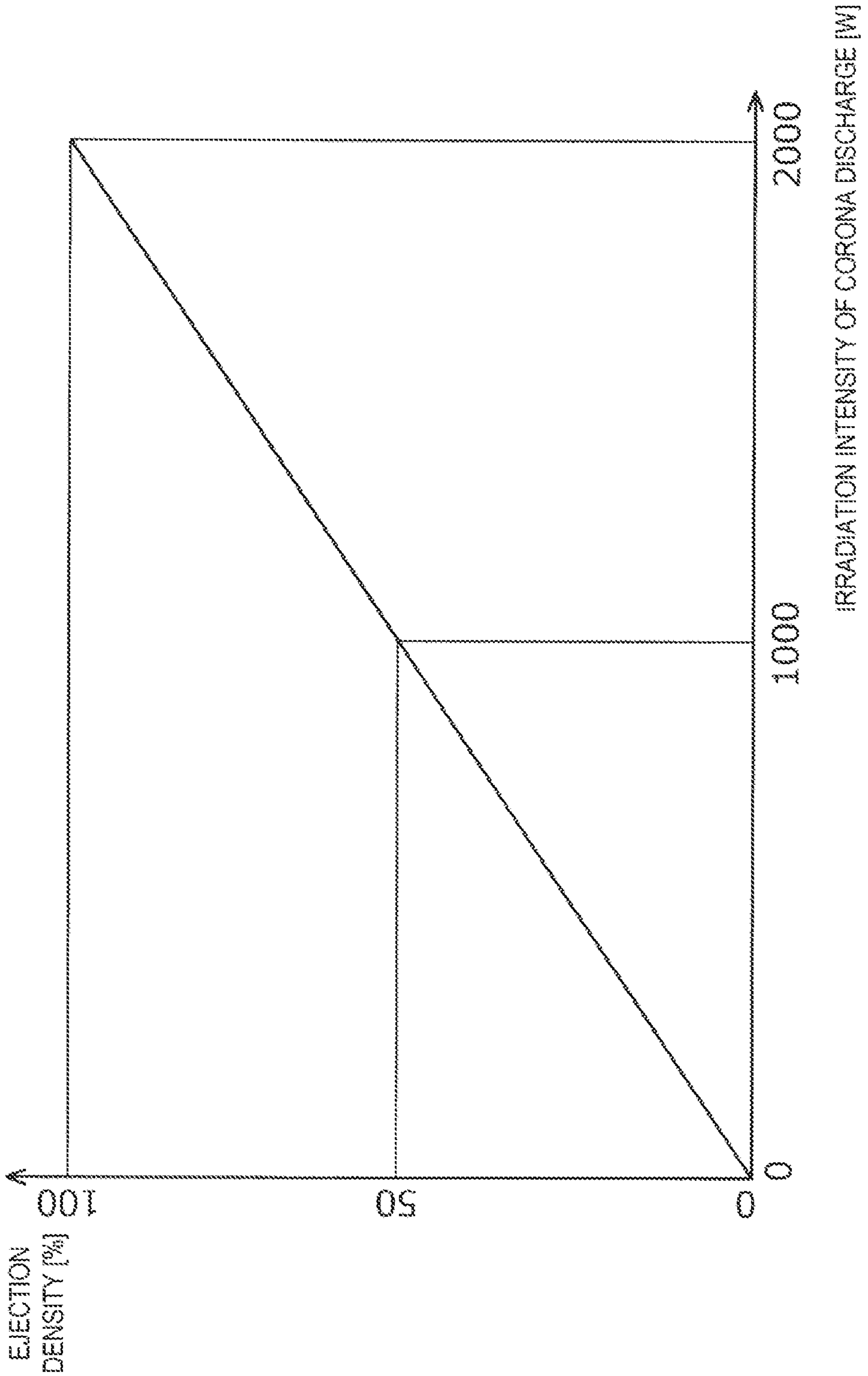
FIG. 4 is a graph showing a relationship between ejection density and irradiation intensity of a corona irradiation unit.

Here, the control unit 120 can change intensity of irradiation, performed by the corona irradiation unit 201, according to ejection density of the white ink, when the target recording medium M is formed with the colored image with the colored ink on the background image after the target recording medium M is formed with the background image with the white ink, that is, when step S190 is performed via step S180. Specifically, when the ejection density of the white ink is high, the intensity of irradiation performed by the corona irradiation unit 201 is increased, and when the ejection density of the white ink is low, the intensity of irradiation performed by the corona irradiation unit 201 is decreased. FIG. 4 is a graph showing a relationship between the ejection density of white ink that can be achieved by the control unit 120 and the intensity of irradiation performed by the corona irradiation unit 201, and the control unit 120, for example, can set the intensity of irradiation performed by the corona irradiation unit 201 to 2000 W as first intensity, when the ejection density of the white ink is 100% as first ejection density. Then, when the ejection density of the white ink is 50% as second ejection density lower than the first ejection density, the intensity of irradiation performed by the corona irradiation unit 201 can be set to 1000 W as second intensity lower than the first intensity.

With another expression, when, by using the recording device 1 of the present working example, the target recording medium M is formed with the colored image on the background image with the colored ink after the target recording medium M is formed with the background image with the white ink, it is possible to perform a recording method for changing the intensity of irradiation performed by the corona irradiation unit 201 according to the ejection density of the white ink. As a result of diligent research by the inventors, it was found that when the target recording medium M was formed with the colored image on the background image with the colored ink after the target recording medium M was formed with the background image with the white ink, an amount of radicals present on a surface of the target recording medium M was reduced in association with irradiation with a corona discharge, and an ejection failure was unlikely to occur. Thus, when the recording method is performed using the recording device 1 of the present working example, it is possible to effectively suppress occurrence of an ink ejection failure by changing the intensity of irradiation performed by the corona irradiation unit 201 according to the ejection density of the white ink, when the above target recording medium M is formed with the colored image on the background image with the colored ink after the target recording medium M is formed with the background image with the white ink.

Here, only when the target recording medium M is a registered target recording medium registered in advance with the storage unit 123, the control unit 120, when the target recording medium M is formed with the colored image with the colored ink on the background image after the target recording medium M is formed with the background image with the white ink, can change the intensity of irradiation, performed by the corona irradiation unit 201, according to the ejection density of the white ink. As a result of diligent research by the present inventors, it was found that, depending on a type of the target recording medium M, an amount of radicals present on a surface of the target recording medium M changes in association with irradiation with a corona discharge. Accordingly, only when the target recording medium M in which an amount of radicals easily increases is registered with the storage 123 in advance, and the target recording medium M is the registered target recording medium, and when the target recording medium M is formed with the colored image on the background image with the colored ink after the target recording medium M is formed with the background image with the white ink, by changing the intensity of irradiation, performed by the corona irradiation unit 201, according to the ejection density of the white ink, it is possible to prevent recording control from becoming complicated, when the target recording medium M is used that does not correspond to the registered target recording medium, and in which an amount of radicals is unlikely to increase, and that is unlikely to cause an ink ejection failure.

Here, in the recording device 1 of the present working example, the target recording medium M including resin as a material is registered with the storage unit 123 as the registered target recording medium. Examples of the target recording medium M including resin as a material include film-based media made of polyethylene terephthalate, polyethylene, polypropylene, or the like, for example. In the target recording medium M including resin as a material, an amount of radicals present on a surface tends to increase in association with irradiation with a corona discharge, and thus an ink ejection failure easily occurs. However, in the recording device 1 of the present working example, since the target recorded medium M including resin as a material is registered with the storage unit 123 as the registered target recording medium, even when the target recording medium M including resin as a material is used, it is possible to effectively suppress occurrence of an ink ejection failure.

Additionally, when the target recording medium M is formed with the colored image with the colored ink without being formed with the background image with the white ink, that is, when step S190 is performed not via step S180, the control unit 120 can change the intensity of irradiation performed by the corona irradiation unit 201 to be equal to or less than 20% of the maximum intensity of irradiation performed by the corona irradiation unit 201 when the target recording medium M is formed with the colored image with the colored ink on the background image after the target recording medium M is formed with the background image with the white ink. For example, in the case of the present working example, the irradiation intensity can be set to equal to or less than 400 W that is 20% of 2000 W, which is the maximum intensity of irradiation performed by the corona irradiation unit 201. In this way, when an ink ejection failure easily occurs, that is, when the target recording medium M is formed with the colored image with the colored ink without being formed with the background image with the white ink, by reducing the intensity of irradiation performed by the corona irradiation unit 201, it is possible to effectively suppress occurrence of an ink ejection failure.

Additionally, as described above, the recording device 1 of the present working example includes the head movement motor 221 as the gap adjustment unit for adjusting the gap PG between the head 110 and the target recording medium M. Then, the control unit 120 can control the head movement motor 221 to widen, the gap PG when the target recording medium M is formed with the colored image with the colored ink without being formed with the background image with the white ink, to be larger than the gap PG when the target recording medium M is formed with the colored image with the colored ink on the background image after the target recording medium M is formed with the background image with the white ink. By widening the gap PG, a radical is unlikely to adhere to the head 110. Thus, when the control unit 120 performs control in this manner, it is possible to effectively suppress occurrence of an ink ejection failure, even when a large number of radicals easily occur on a surface of the target recording medium M, that is, when the target recording medium M is formed with the colored image with the colored ink without being formed with the background image with the white ink.

Further, as described above, the recording device 1 of the present working example includes the maintenance unit including the wiper, the suction cap, the maintenance unit driving motor 222, and the like for maintaining the head 110. Normally, the maintenance by the maintenance unit is performed at a predetermined interval, but the control unit 120 can control the maintenance unit to decrease an interval of maintenance performed by the maintenance unit when the target recording medium M is formed with the colored image with the colored ink without being formed with the background image with the white ink, to be shorter than the interval of maintenance performed by the maintenance unit when the target recording medium M is formed with the colored image the background image with the colored ink after the target recording medium M is formed with the background image with the white ink. When the maintenance interval is shortened, a radical is less likely to remain in the head 110. Thus, when the control unit 120 performs control in this manner, it is possible to effectively suppress occurrence of an ink ejection failure, even when a large number of radicals easily occur on a surface of the target recording medium M, that is, when the target recording medium M is formed with the colored image with the colored ink without being formed with the background image with the white ink.

Additionally, in the recording device 1 of the present working example, the control unit 120 can automatically add the data for forming the background image by the white ink to the recorded data, when the target recording medium M used is the registered target recording medium that is registered with the storage unit 123 in advance, and the data for forming the background image by the white ink is not included in the recorded data. Therefore, the recording device 1 of the present working example can register the target recording medium M on which a large amount of radicals are present on a surface in association with irradiation with a corona discharge with the storage unit 123 as the registered target recording medium, to prevent the background image to be formed by the white ink, such that a large number of radicals are not present on the surface of the target recording medium M, thereby effectively suppressing occurrence of an ink ejection failure. In addition, in this case, the ejection density of the white ink when data is automatically added for forming the background image by the white ink to recorded data may be changed according to the irradiation intensity set as the intensity of irradiation performed by the corona irradiation unit 201.

Further, the recording device 1 of the present working example includes the first recording mode and the second recording mode as the recording modes. Then, the control unit 120, in the first recording mode, when the target recording medium M is the registered target recording medium that is registered in advance, and the data for forming the background image by the white ink is not included in the recorded data, automatically adds the data for forming the background image by the white ink to the recorded data. On the other hand, the control unit 120, in the second recording mode, when the target recording medium M is the registered target recording medium that is registered in advance, and the data for forming the background image by the white ink is not included in the recorded data, does not add the data for forming the background image by the white ink to the recorded data. Thus, when a user does not want to form the background image, by selecting the second recording mode, the background image is not formed and the colored image can be formed.

Additionally, in the recording device 1 of the present working example, the control unit 120, when the target recording medium M is the registered target recording medium that is registered in advance, and the data for forming the background image by the white ink is included in the recorded data, does not add the data for forming the background image by the white ink to the recorded data. That is, the recording device 1 of the present working example, when the data for forming the background image by the white ink is included in the recorded data, prevents the data for forming the background image by the white ink from being further added, such that recording processing is not complicated.

Additionally, in the recording device 1 of the present working example, the control unit 120, when the target recording medium M is the registered target recording medium that is registered in advance, the data for forming the background image by the white ink is not included in the recorded data, and the data for forming the background image by the white ink is automatically added to the recorded data, can change the intensity of irradiation, performed by the corona irradiation unit, according to the ejection density of the white ink. Although there is a tendency that as the ejection density of the white ink increases, an amount of radicals present on the target recording medium M decreases, by changing the intensity of irradiation, performed by the corona irradiation unit 201, in accordance with such a tendency, it is possible to effectively suppress occurrence of an ink ejection failure.

the present disclosure is not limited to the present embodiments described above, and can be realized in various configurations without departing from the gist of the present disclosure. For example, appropriate replacements or combinations may be made to the technical features in the present embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A recording device, comprising:

a transport unit configured to transport a target recording medium;

a corona irradiation unit disposed in a transport path of the target recording medium and configured to modify a surface of the target recording medium by irradiating the surface with corona discharge;

an ejecting unit disposed downstream of the corona irradiation unit in the transport path and configured to eject ink onto the target recording medium; and a control unit configured to control driving of the transport unit, the corona irradiation unit, and the ejecting unit, wherein the ejecting unit includes a first head and a second head, the first head ejecting, as the ink, a white ink for forming a background image, the second head being disposed downstream of the first head in the transport path and ejecting a colored ink for forming a colored image, and the control unit changes intensity of the irradiation, performed by the corona irradiation unit, according to presence of the background image and an ejection density of the white ink in the background image.

2. The recording device according to claim 1, wherein, in a case in which the target recording medium is a registered target recording medium registered in advance, when the target recording medium is formed with a colored image with the colored ink on the background image after the target recording medium is formed with the background image with the white ink, the control unit changes the intensity of the irradiation, performed by the corona irradiation unit, according to the ejection density of the white ink.

3. The recording device according to claim 2, wherein the registered target recording medium includes resin as a material.

4. The recording device according to claim 1, wherein, when the target recording medium is formed with the colored image with the colored ink without being formed with the background image with the white ink, the control unit changes the intensity of the irradiation, performed by the corona irradiation unit, to be 20% or less of the maximum intensity of the irradiation performed by the corona irradiation unit when the target recording medium is formed with the colored image with the colored ink on the background image after the target recording medium is formed with the background image with the white ink.

5. The recording device according to claim 1, comprising:

a gap adjustment unit configured to adjust a gap between the ejecting unit and the target recording medium, wherein the control unit controls the gap adjustment unit such that the gap when the target recording medium is formed with the colored image with the colored ink without being formed with the background image with the white ink is wider than the gap when the target recording medium is formed with the colored image with the colored ink on the background image after the target recording medium is formed with the background image with the white ink.

6. The recording device according to claim 1, comprising:

a maintenance unit configured to maintain the ejecting unit, wherein the control unit controls the maintenance unit such that an interval of maintenance performed by the maintenance unit when the target recording medium is formed with the colored image with the colored ink without being formed with the background image with the white ink is shorter than an interval of maintenance performed by the maintenance unit when the target recording medium is formed with the colored image with the colored ink on the background image after the target recording medium is formed with the background image with the white ink.

7. A recording device, comprising:

a transport unit configured to transport a target recording medium;

a corona irradiation unit disposed in a transport path of the target recording medium and configured to modify a surface of the target recording medium by irradiating the surface with corona discharge;

an ejecting unit disposed downstream of the corona irradiation unit in the transport path and configured to eject ink onto the target recording medium; and a control unit configured to control driving of the transport unit, the corona irradiation unit, and the ejecting unit, wherein the ejecting unit includes a first head and a second head, the first head ejecting, as the ink, a white ink for forming a background image, the second head being disposed downstream of the first head in the transport path and ejecting a colored ink for forming a colored image, and when the target recording medium is a registered target recording medium registered in advance, and no data for forming the background image with the white ink is included in recorded data, the control unit automatically adds, to the recorded data, the data for forming the background image with the white ink, and when the target recording medium is a registered target recording medium registered in advance, and no data for forming the background image with the white ink is included in the recorded data, the control unit changes intensity of the irradiation, performed by the corona irradiation unit, according to ejection density of the white ink when automatically adding, to the recorded data, the data for forming the background image with the white ink.

8. The recording device according to claim 7, wherein a first recording mode and a second recording mode are included as a recording mode, in the first recording mode, when the target recording medium is a registered target recording medium registered in advance, and no data for forming the background image with the white ink is included in the recorded data, the control unit automatically adds, to the recorded data, the data for forming the background image with the white ink, and in the second recording mode, when the target recording medium is the registered target recording medium registered in advance, and no data for forming the background image with the white ink is included in the recorded data, the control unit does not add, to the recorded data, the data for forming the background image with the white ink.

9. The recording device according to claim 7, wherein, when the target recording medium is a registered target recording medium registered in advance, and data for forming the background image with the white ink is included in the recorded data, the control unit does not add, to the recorded data, the data for forming the background image with the white ink.

10. A recording method performed using a recording device, the recording device including a transport unit configured to transport a target recording medium, a corona irradiation unit disposed in a transport path of the target recording medium and configured to modify a surface of the target recording medium by irradiating the surface with corona discharge, and an ejecting unit disposed downstream of the corona irradiation unit in the transport path and configured to eject ink onto the target recording medium, the ejecting unit including a first head and a second head, the first head ejecting, as the ink, a white ink for forming a background image, the second head being disposed downstream of the first head in the transport path and ejecting a colored ink for forming a colored image, the recording method comprising:

changing intensity of the irradiation, performed by the corona irradiation unit, according to presence of the background image and an ejection density of the white ink in the background image.

* * * * *